UNITED STATES PATENT OFFICE.

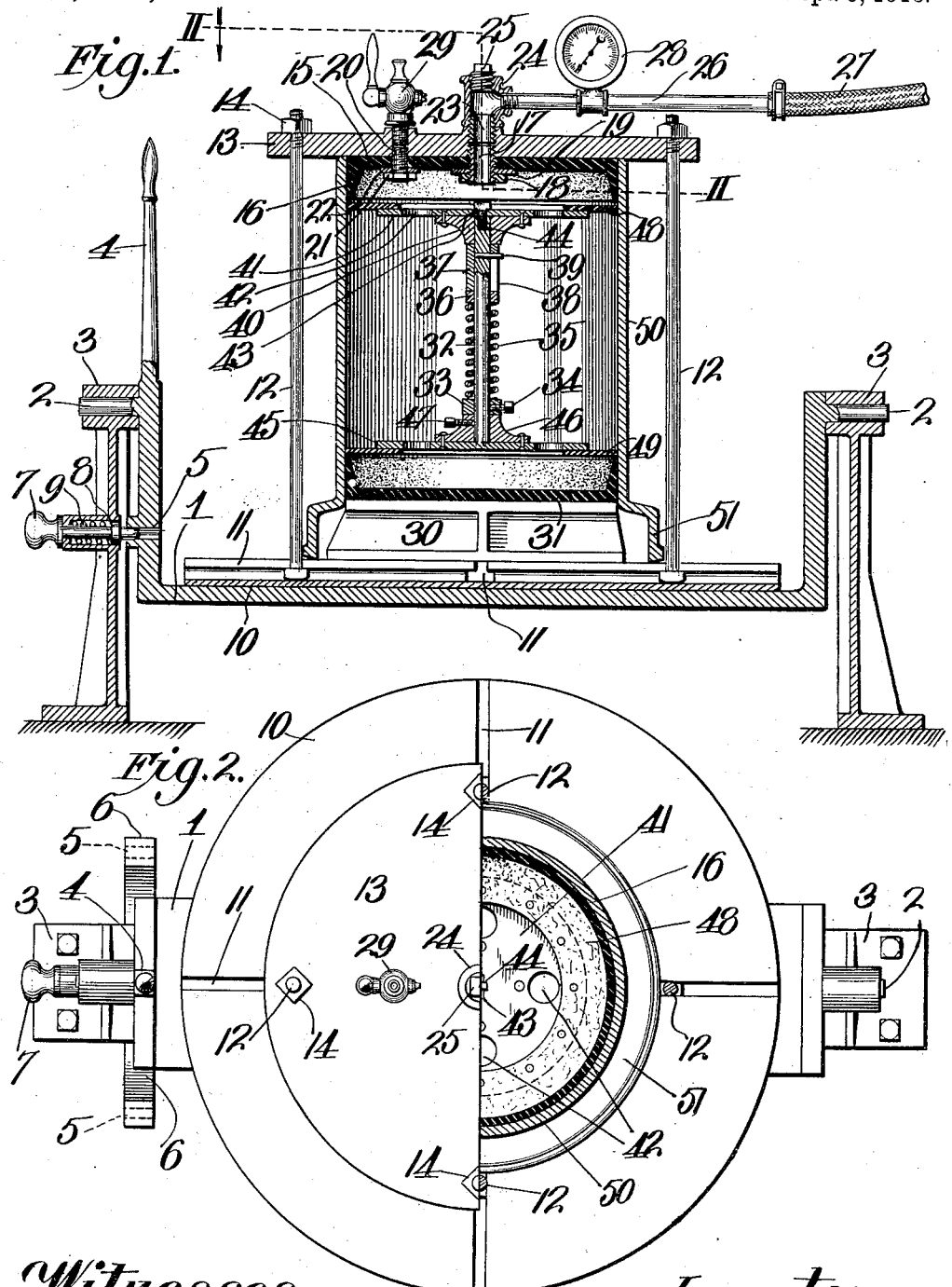

JOSEPH L. CAUSEY, OF KANSAS CITY, MISSOURI.

HYDROSTATIC PIPE-TESTING MACHINE.

1,072,912.  Specification of Letters Patent.  Patented Sept. 9, 1913.

Application filed January 6, 1913. Serial No. 740,520.

*To all whom it may concern:*

Be it known that I, JOSEPH L. CAUSEY, a citizen of the United States, residing at Kansas City, in the county of Jackson and State of Missouri, have invented certain new and useful Improvements in Hydrostatic Pipe-Testing Machines, of which the following is a specification.

This invention relates to hydrostatic pipe testing machines, and has for its object to produce a machine by which clay, and analogous cement pipes may be quickly, efficiently and economically tested for strength and defects.

With this general object in view and others as hereinafter appear, the invention consists in certain novel and peculiar features of construction and organization as hereinafter described and claimed; and in order that it may be fully understood reference is to be had to the accompanying drawing, in which—

Figure 1, is a central vertical section of a machine embodying my invention. Fig. 2, is a view partly in top plan and partly in horizontal section on the dotted line II—II of Fig. 1.

In the said drawing where like reference characters identify corresponding parts in all the figures, 1 is a U-shaped frame pivotally suspended by trunnions 2, upon suitably supported standards 3. For convenience in pivotally operating said frame, one of its sides is formed or provided with a lever 4, and to secure the frame at any desired point in its pivotal adjustment, it is provided with a series of holes 5 extending concentrically of the axis of rotation; it being noted by reference to Fig. 2, that one side of said frame is provided with lateral extensions 6, in which some of the holes 5 are formed, as the width of the frame in the proportion shown, is not sufficient to accommodate a sufficient number of holes 5 to admit of the securing of the frame in a horizontal position toward either side, as is sometimes desirable.

7 is a pin extending through the standard 3, adjacent to the side of the frame containing the openings 5, and said pin is provided with a collar 8, against which bears the front end of a spring 9 reacting against part of the standard, the arrangement being such that the spring holds the pin yieldingly advanced and either in or ready to snap into engagement with the first hole 5 which registers with it in the pivotal adjustment of the frame.

10 is a circular table mounted rigidly upon frame 1, and provided in its upper side with a pair of diametric channels 11, which intersect and extend at right angles to each other, said channels being of inverted T-shape in cross section for the purpose of slidingly receiving and holding the headed ends of a plurality of inverted tie-rods or bolts 12, the upper ends of which extend loosely through a clamp plate 13 engaged at its upper side by nuts 14, on the upper ends of said rods. Fitting against the underside of clamp plate 13 is a cup-shaped packing of rubber or analogous material comprising a disk 15 having a depending annular flange 16, tapered downwardly at its inner side.

17 is a short externally threaded pipe section extending into clamping plate 13, from its underside, and through the cup-shaped packing described. As a convenient means of retaining the latter in position, a nut 18 engages the lower end of the pipe section, and a washer 19 is mounted on the pipe section between the cup-shaped packing and said nut 18. A short externally threaded pipe section 20 also extends up through the packing into the clamp plate 13, and to aid in securing the latter in position, the said pipe section 20 is provided with a nut 21 and a washer 22, the latter being interposed between the nut and the packing. The pipe sections 17 and 20 have important functions hereinafter referred to, and their use in securing the packing in position is merely incidental or secondary to such functions.

23 is an externally threaded pipe section screwed into the top of the plate and communicating with pipe section 17, and screwed on the upper end of the pipe section 23 is a T-coupling 24, normally closed at its upper end by a plug 25, and connected at its stem end, to a pipe 26, to which is adapted to be secured as shown or in any other suitable manner, a flexible hose 27, and said pipe 26 is equipped with a pressure gage 28.

An ordinary air-vent cock 29 is screwed into the clamping disk from above and communicates with the pipe section 20.

30 is what may be termed a stool or platform of circular form and adapted to rest upon the circular table 10, and carry a cup-shaped packing 31, corresponding in all respects to packing 15, but arranged in inverted position with respect thereto.

For expanding the cup-shaped packings 15 and 31 into water tight connections with a section of clay, cement or analogous pipe, hereinafter identified, I provide the following expanding appliance:—32 is a rod equipped near its lower end with a collar 33 held in place by set screw 34 against the pressure of a helical spring 35 mounted on the rod and bearing at its upper end against a collar 36, engaging the lower end of a sleeve 37 fitting on the rod and provided with a longitudinal slot 38 receiving a pin 39 projecting from the rod. 40 is a collar mounted on the rod above the slotted sleeve 37, and mounted upon said collar and secured thereto is a circular plate 41, provided near its periphery with a circular series of holes 42. Centrally plate 41 is formed with a short slot 43, and extending through said slot and screwed into the upper end of rod 32 is a bolt 44, having an elongated head, which, when turned at right angles to the slot 43, holds the perforated plate 41 and collar 40 reliably upon the rod, but which when turned parallel with slots 43 permits of the removal of said plate and collar from the rod. 45 is a plate corresponding to plate 42 except that it may lack the central opening, and said plate is fastened to the collar 46 secured upon the lower end of the rod 32 by a set screw 47. Riveted or otherwise affixed to plates 41 and 45 at the upper and lower sides thereof respectively, are flexible rings 48 and 49, these rings surrounding the circular plane of the holes in said plates and substantially corresponding in diameter to the cup-shaped packings 15 and 31.

To test a section of clay or cement pipe 50, enlarged at one end at 51, as customary, the stool or platform 30 equipped with the cup-shaped packing 31, is arranged centrally upon table 10. The pipe section is then placed upon said table around the stool or platform and said packing and the expansion appliance is inserted in the pipe from above, until its flexible ring 49 rests upon the packing 31. The top clamp plate is then fitted down upon the pipe and tie rods 12, with its cup-shaped packing 15 within the upper end of the pipe.

After the clamp plate 13 is secured in position, plug 25 is removed and a suitable tool, not shown, is inserted through coupling 24 and pipe sections 23 and 17, and engaged with the head of bolt 44, and the same is turned until its head is parallel with slot 43 in plate 41, so as to permit the spring 35 to slide the superposed parts upward until the preferably flexible ring 48 engages the lower end of the flange of packing 15. The spring is preferably sufficiently powerful to force the rings slightly into the cup-shaped packings, and in so doing will preferably cause the ring 48 to bow upward slightly and the ring 49 to bow downward slightly, as will be readily understood, this bowing being produced of course through the resistance offered by the flanges of the cup-shaped packings, reinforced by the pipe. As a result of this pressure the flanges are spread outward or expanded so as to make water tight connections with the interior of the pipe, it being apparent that the resilience of the flanges of the cup-shaped packings, insure proper connections irrespective of slight irregularities that may exist in the internal surface of the pipe. The plug 25 being replaced and cock 29 opened, water is admitted through the hose 27 and the connections described, to the interior of the pipe and quickly fills the same. The air is vented through the cock 29 which is closed as the water starts to overflow through it. The water for testing pipes of this character is generally supplied at a pressure of about thirty three pounds, which the pipe must withstand without rupture or leakage, though it is obvious that the particular pressure is immaterial from a patentable standpoint.

If the pipe appears to leak and it cannot be determined at a glance while it is upright at what point the water escapes, the pin 7 is withdrawn to unlock the frame 1, and lever 4 is manipulated to rock said frame until the pipe occupies a horizontal position or any position between its normally upright position and a horizontal position, and in the position to which it is adjusted, it can be secured by permitting pin 7 to engage the proper hole 5 in the frame or one of the extensions thereof.

With the pipe in a tilted or horizontal position the operator can readily see if the water escapes at the top of the pipe, an indication of a defective joint between the pipe and packing 15 or 31, as the case might be, or if the escape is due to a hole or crack in the pipe itself. This question cannot always be determined when the pipe is in an upright position because the escaping water is so widely distributed over the external surface of the pipe.

It will be understood that the large channeled table makes provision for adjustment of the tie rods to accommodate pipe of different sizes, and that for testing pipes of different sizes there will be different cup packings, and ring-carrying plates for use with the rod, spring, collars and sleeve of the expanding appliance.

From the above description it will be apparent that I have produced a hydrostatic pipe-testing machine embodying the features of advantage enumerated as desirable in the statement of the object of invention, and I wish it to be understood that I reserve the right to make all changes properly falling within the principle of the invention as defined in the appended claims.

I claim.

1. In a hydrostatic pipe testing machine, a table for supporting a pipe standing on end, a pair of compressible cup-shaped packings secured within the pipe, a pair of rings in the pipe, and means for effecting movement whereby the rings enter and expand the packings.

2. In a hydrostatic pipe testing machine, a table for supporting a pipe standing on end, a pair of compressible cup-shaped packings secured within the pipe, a pair of rings in the pipe, and means whereby rings are forced into the packings and under such force are bowed and expand the said packings and cause the same to engage the pipe with a liquid-tight relation.

3. In a hydrostatic pipe testing machine, a table for supporting a pipe standing on end, a pair of compressible cup-shaped packings secured within the pipe, a pair of rings in the pipe, and a spring for forcing the rings into and expanding the said packings and causing the same to engage the pipe with a liquid-tight relation.

4. In a hydrostatic pipe testing machine, a table for supporting a pipe standing on end, a pair of compressible cup-shaped packings secured within the pipe, and an appliance for spreading said packings, located in the pipe, comprising a rod, a perforated plate fixed to the same at one end, a similar plate slidable on the rod at its opposite end, a spring for forcing said plates apart and toward the adjacent cup-shaped packings, and flexible rings secured to said plates and adapted as the latter are actuated by the spring, to engage and expand said packings against the interior surface of the pipe.

5. In a hydrostatic pipe testing machine, a table for supporting a pipe standing on end, a pair of compressible cup-shaped packings secured within the pipe, a pair of rings in the pipe, means for effecting movement whereby the packings receive and are expanded by the rings, and means for introducing water under pressure into the pipe to test the same for strength and defects.

6. In a hydrostatic pipe testing machine, a table for supporting a pipe standing on end, a pair of compressible cup-shaped packings secured within the pipe, a pair of rings in the pipe, means for effecting movement whereby the packings receive and are expanded by the rings, means for introducing water under pressure into the pipe to test the same for strength and defects, and valve controlled means for venting the air from the pipe as the water is supplied thereto.

7. In a hydrostatic pipe testing machine, a table for supporting a pipe standing on end, a pair of compressible cup-shaped packings secured within the pipe, a pair of rings in the pipe, means for effecting movement whereby the packings receive and are expanded by the rings, means for introducing water under pressure into the pipe to test the same for strength and defects, valve-controlled means for venting the air from the pipe as the water is supplied thereto, and a gage to indicate the pressure of the water in the pipe.

8. In a hydrostatic pipe testing machine, a table for supporting a pipe standing on end, a clamp plate to rest upon the upper end of the pipe, means for clamping the plate and table tightly against the ends of the pipe, a cup-shaped packing fitting in the lower end of the pipe, a stool supporting the packing in position, an inverted cup-shaped packing secured to the said clamp plate and fitting in the upper end of the pipe, and means within the pipe, for expanding the cup-shaped packings until liquid-tight joints are established between them and the pipe.

9. In a hydrostatic pipe testing machine, a table for supporting a pipe standing on end, a clamp plate to rest upon the upper end of the pipe, means for clamping the plate and table tightly against the ends of the pipe, a cup-shaped packing fitting in the lower end of the pipe, a stool supporting the packing in position, an inverted cup-shaped packing secured to the said clamp plate and fitting in the upper end of the pipe, and spring-actuated means for expanding said packings until they establish liquid-tight joints with the pipe.

10. In a hydrostitic pipe testing machine, a table for supporting a pipe standing on end, a clamp plate to rest upon the upper end of the pipe, means for clamping the plate and table tightly against the ends of the pipe, a cup-shaped packing fitting in the lower end of the pipe, a stool supporting the packing in position, an inverted cup-shaped packing secured to the said clamp plate and fitting in the upper end of the pipe, means within the pipe, for expanding the cup-shaped packings until liquid tight joints are established between them and the pipe, means for introducing a fluid under pressure into the pipe to test the same for strength and defects, and a valve-controlled vent communicating with the upper end of the pipe through the upper packing.

11. In a hydrostatic pipe testing machine, a suitable support, a table pivotally carried thereby for the support of a pipe standing on end, a plate resting upon the upper end of said pipe, means to clamp the table and plate against the opposite ends of the pipe, a pair of cup-shaped packings supported within the pipe with their hollow sides facing each other, a fluid supply pipe communicating with the interior of the first-named pipe, a valve-controlled vent also communicating with the interior of the said first-named pipe, and means within the pipe for expanding the packings to make liquid tight joints with the said pipe.

12. In a hydrostatic pipe testing machine, a suitable support, a table pivotally carried thereby for the support of a pipe standing on end, a plate resting upon the upper end of said pipe, means to clamp the table and plate against the opposite ends of the pipe, a pair of cup-shaped packings supported within the pipe with their hollow sides facing each other, a fluid supply pipe communicating with the interior of the first-named pipe, a valve-controlled vent also communicating with the interior of the said first-named pipe, means within the pipe for expanding the packings to make liquid-tight joints with the said pipe, and means for securing the table at different points in its pivotal adjustment.

In testimony whereof I affix my signature in presence of two witnesses.

JOSEPH L. CAUSEY.

Witnesses:
FRANK R. GLOVER,
G. Y. THORPE.

---

Copies of this patent may be obtained for five cents each, by addressing the "Commissioner of Patents, Washington, D. C."